3,834,940
METHOD OF REFINING AN ENZYMATICALLY PRODUCED FRUCTOSE CONTAINING SOULTION

Khaja Khaleeluddin and Robert Fredric Sutthoff, Clinton, and William Junior Nelson, Camanche, Iowa, assignors to Standard Brands Incorporated, New York, N.Y.
No Drawing. Original application Jan. 28, 1971, Ser. No. 110,748, now abandoned. Divided and this application Oct. 30, 1972, Ser. No. 302,142
Int. Cl. C13d 3/14; C13k 1/00, 9/00
U.S. Cl. 127—46 A
4 Claims

ABSTRACT OF THE DISCLOSURE

An enzymatically produced fructose-containing solution is refined by sequentially treating the solution with activated carbon, maintaining the solution at an acidic pH and contacting the solution with a strong acid cation exchange resin in the hydrogen form and then with a weak base anion exchange resin in the free base form.

This application is a divisional of copending application Ser. No. 110,748, filed Jan. 28, 1971, now abandoned.

THE INVENTION

The invention is directed to a refined fructose-containing solution and methods of producing the same. More particularly, the present invention is directed to a refined fructose-containing solution produced by an enzymatic process.

Methods of enzymatically producing fructose-containing solutions are well known in the art. The enzyme used in these methods is referred to in the art as glucose isomerase.

Microorganisms which produce glucose isomerase are well known in the art. For example, in an article appearing in Science, Vol. 125, pp. 648–9 (1957), it is disclosed that an enzyme derived from Pseudomonas hydrophila will isomerize glucose to fructose. Also, British Pat. 1,103,394 and Japanese 7428 (1966) to Takasaki et al. disclose that microorganisms classified as belonging to the Streptomyces genus, such as Streptomyces flavovirens, Streptomyces achromogenes, Streptomyces echinatus and Streptomyces albus produce glucose isomerase. There are many other microorganisms which are disclosed in the art as producing glucose isomerase. A few of the other microorganisms disclosed are, for instance, Aerobacter cloacae, Bacillus megaterium, Acetobacter suboxydans, Acetobacter melanogenus, Acetobacter roseus, Acetobacter oxydans, Bacillus fructose and Lactobacillus fermenti.

There are many variables to be considered in the use of glucose isomerase on a commercial scale. For instance, the conditions at which the isomerization reaction is performed affect both the life of the enzyme and the amount of fructose produced. The conditions of isomerization on a commercial scale, generally, are not those which provide maximum life of the enzyme. Glucose isomerase, like all enzymes, is heat sensitive, and as the temperature is increased there is accordingly a decrease in activity of the isomerase due to heat denaturation thereof. At low temperatures, however, the isomerization reaction proceeds so slowly as to make the process uneconomical. Another factor which must be considered is the pH of the isomerization medium. This affects the life of the isomerase, the amount of psicose formed during the isomerization reaction, and the color and color stability of the isomerized liquor. All these factors must be balanced in order to provide an economical and commercially feasible process. In U.S. Patent Applications Ser. No. 88,190 and Ser. No. 88,187, now abandoned, both filed Nov. 9, 1970, incorporated herein by reference, there are disclosed processes designed for commercial utilization. Practicing these processes results in an enzymatically produced fructose-containing solution which has minimal quantities of unwanted by-products, color bodies and color-forming bodies. For instance, the color formed during the isomerization reaction will preferably be less than 0.05 color units and the fructose-containing solution is exceedingly stable as to color formation during storage. Also, other unwanted by-products, such as psicose, produced during the isomerization reaction are negligible.

Although, as shown above, the enzymatically produced fructose-containing solutions produced by the methods disclosed in the two aforementioned patent applications are relatively pure, it is necessary to refine the same in order to remove color, color-forming bodies and salts therefrom.

There are many processes known in the art for refining sugar syrups. For instance, in U.S. Pat. No. 3,305,395 and U.S. Pats. 3,285,776 and 3,383,245 there are disclosed techniques for refining alkaline isomerized liquors. One of the problems associated with these techniques is that due to relatively high pH values employed during refining unwanted by-products such as psicose are produced.

Therefore, it is a principal object of the present invention to produce a refined enzymatically produced fructose-containing solution that contains substantially no color or psicose and is exceedingly stable as to color formation on storage.

This object and other objects of the present invention, which will be apparent from the following description, are attained in accordance with the present invention by treating an enzymatically produced fructose-containing solution which contains color and color-forming bodies with carbon to remove substantially the major portion of the color and color-forming bodies therefrom, maintaining the solution at an acidic pH, treating the solution with a strong acid cation exchange resin in the hydrogen form and a weak base anion exchange resin in the free base form to remove substantially all the remaining color and color-forming bodies thereby producing a fructose-containing solution which is bland, substantially colorless and is stable as to color formation on storage and contains substantially no psicose.

The term "Color Units" used herein is defined by the following:

COLOR UNITS

Color was determined spectrophotometrically by measuring the absorbance of an appropriately diluted liquor in a 1-cm. cell at 450 mµ and 600 mµ versus water as a reference. The spectrophotometer was a Beckman DK–2A, manufactured by Beckman Instrument Company. The color was calculated by using the following formula:

$$\text{Color Units} = \frac{(109)(A_{450} - A_{600})}{C}$$

$A_{450}$ = absorbance at 450 mµ
$A_{600}$ = absorbance at 600 mµ
C = concentration (g./100 ml.)

Generally the isomerization reaction is performed at temperatures in the range of 50° to 75° C. and at pH values in the range of 6 to 8.5. In some instances, there may be present metallic ions to stabilize and/or activate the glucose isomerase. Metallic ions which have been used for this purpose are, for example, the salts of cobalt, magnesium, etc. These pH and temperature ranges are conductive to the formation of color, color-forming bodies and psicose.

The period that the fructose-containing solutions is held at these conditions, of course, directly affects the amounts of impurities produced. By the processes disclosed in U.S. Patent Applications Ser. No. 88,190 and Ser. No. 88,187, both filed Nov. 9, 1970, the formation of impurities is kept to a minimum and fructose-containing solutions having the characteristics shown in Table I below, are produced. Although the present process is aptly suited for refining fructose-containing solutions produced by the processes disclosed in the afore-mentioned patent applications, it is also suitable for refining any enzymatically produced fructose-containing solution having the characteristics set forth in Table I.

TABLE I.—CHARACTERISTICS OF UNREFINED FRUCTOSE-CONTAINING SOLUTIONS
[Percent dry basis]

| Ranges | Glucose [1] | Fructose [1] | Polysaccharides [1] | Psicose [3] | Ash [2] | Color units |
|---|---|---|---|---|---|---|
| Typical | 30 to 60 | 10 to 54 | 0 to 50 | 0 to 1 | 0.1 to 0.5 | 0 to 2.0 |
| Preferred | do | do | 0 to 30 | 0 to 0.5 | 0.1 to 0.2 | 0 to 0.05 |
| Most preferred | do | do | do | 0 to 0.1 | 0.005 to 0.1 | 0 to 0.03 |

[1] Amount of the saccharides principally dependent upon characteristics desired in the product.
[2] Principally composed of metallic salts which are present during isomerization to stabilize and/or activate the glucose isomerase.
[3] Determined by the method described in the article entitled, "Chromatographic Determination of Saccharides in Starch Hydrolysates," L. D. Ough (published in *Methods of Carbohydrate Chemistry*, Vol. IV, page 91 (1964), except that the developing solvent employed was ethyl acetate, pyridine, water (8:2:1 v./v.).

As indicated above, isomerization conditions are conducive to the formation of color, color-forming bodies and psicose. Therefore, the longer the enzymatically produced fructose-containing solution is held under isomerization conditions subsequent to the isomerization reaction, the greater the amount of impurities formed. Thus, it is advisable to refine the fructose-containing solutions as soon as possible after the isomerization reaction is completed. If the solution is to be stored for an excessive period prior to refining, the temperature thereof should be lowered to a range of 37° to 60° C. and the pH lowered to a range of from about 4 to about 5.5. This will substantially prevent any further impurity formation in the solution.

In the process of the present invention, the fructose-containing solution is first refined by a carbon treatment, for instance, by passing the solution through a bed of activated granular carbon or by slurrying the solution with activated powdered carbon and removing the same by filtration. This carbon treatment will remove the major portion of the color and color-forming bodies from the solution. Typically, when using activated granular carbon a burn ratio of from about 0.1 to about 4, and most preferably about 1 is used. Burn ratio is defined as the pounds of granular carbon that must be reactivated per 100 pounds of solids in the solution processed to obtain a solution having a color of less than 0.01 color units. Examples of suitable activated carbons are those marketed by Pittsburgh Activated Carbon Co. under the trade names Pittsburgh Types CPG and SGL, and West Virginia Pulp and Paper Co., under the trade names NuChar Types CEE and WVL.

It is a preferred embodiment of the present invention that the pH of the fructose-containing solution prior to being treated with carbon be lowered to a range of from about 3 to about 5 and a most preferred embodiment that the pH be lowered to a range of from about 4.0 to about 4.5. Hydrochloric acid is suitable for this purpose.

Next, the fructose-containing solution is treated with a strong acid cation exchange resin in the hydrogen form. This treatment removes substantially all the metallic ions which are present during the isomerization reaction. If these metallic ions are not removed the ash content of the solution will be exceedingly high. Also, this treatment removes a portion of the remaining color and color-forming bodies. Suitable strong acid cation exchange resins are those marketed by Diamond Shamrock Co. under the trade names of Duolite C-3 and Duolite C-25, by Rohm and Haas Co. under the trade name of Amberlite 200 and Dow Chemical Co. under the trade name of Dowex 50-W.

After treating the solution with a strong acid cation exchange resin it is treated with a weak base anion exchange resin in the free base form. In this step, various acids which were generated during previous ion exchange treatment are removed and the pH of the fructose-containing solution is adjusted upwardly, for instance, to a pH range of from about 5 to about 7. Examples of suitable weak base anion exchange resins which may be used are those marketed by Diamond Shamrock Co., under the trade name of Duolite A-6 and Rohm and Haas Co., under the trade name of Amberlite IRA-93.

It is preferred after the last refining treatment to lower the pH of the fructose-containing solution to a value in the range of from about 4.0 to about 4.5. Any suitable acid may be used for this purpose although it is preferred to use hydrochloric acid.

As the exchange capacity of the resins is decreased, their effectiveness decreases until they must be regenerated. There is a range, however, where although they are not completely effective they do still have some exchange capacity remaining. When the resins are at this stage they are not suitable by themselves to completely refine a fructose-containing solution. However, they may be used to partially refine the solution and another set of exchange resins i.e., strong acid exchange and weak base exchange in free base form whose effectiveness has not been substantially decreased, used thereafter to completely refine the solution. When the first set of exchange resins has substantially lost its exchange capacity, it is regenerated and the second set of resins is substituted therefor and another set of fresh resins substituted for the last set. When the resins are used in this manner maximum utilization of the resins is accomplished.

It is another embodiment of the present invention to provide a refined fructose-containing solution having the characteristics shown in Table II below.

TABLE II.—CHARACTERISTICS OF REFINED FRUCTOSE-CONTAINING SOLUTIONS
[Percent dry basis]

| Ranges | Glucose [1] | Fructose [1] | Polysaccharides [1] | Psicose [3] | Ash [2] | Color units | Color stability [4] |
|---|---|---|---|---|---|---|---|
| Typical | 30 to 60 | 10 to 54 | 0 to 50 | 0 to 1 | 0 to 0.05 | 0 to 0.02 | 0 to 0.1 |
| Preferred | do | do | 0 to 30 | 0 to 0.5 | 0 to 0.03 | 0 to 0.01 | 0 to 0.02 |
| Most preferred | do | do | do | 0 to 0.1 | 0 to 0.01 | 0 to 0.005 | 0 to 0.01 |

[1] Amount of the saccharides principally dependent upon characteristics desired in the product.
[2] Principally composed of metallic salts which are present during isomerization to stabilize and/or activate the glucose isomerase.
[3] Determined by the method described in the article entitled, "Chromatographic Determination of Saccharides in Starch Hydrolysates," L. D. Ough (published in *Methods of Carbohydrate Chemistry*, Vol. IV, page 91 (1964)), except that the developing solvent employed was ethyl acetate, pyridine, water (8:2:1 V./V.).
[4] Color stability is measured by adjusting the solution to a pH of 4.8, maintaining the solution in a boiling water bath for one hour and measuring the color developed by the Method F-14 of the Second Edition of the Standard Analytical Methods of the Member Companies of the Corn Industries Research Foundation, Inc.

In a number of uses the refined fructose-containing solution of the present invention provides benefits which could not be achieved by the use of conventional dextrose syrups, invert syrups, sucrose syrups or sucrose. For example, in many applications corn syrups and sucrose are used together to provide a dual sweetening system to obtain the particular functional advantage of corn syrup and the sweetening power of the sucrose. Since the fructose-containing solutions of the present invention are generally very sweet and contain a relatively large amount of monosaccharides, including dextrose, such solutions can replace the dual sweetening system. For the user, a single sweetening system, like the fructose-containing solutions of the present invention, is easier to handle and store. This, of course, provides obvious economic benefits. Furthermore, when sucrose is used in many products, inversion takes place which results in the sweetness of the product varying on storage, i.e., sweetness will vary as more sucrose is inverted. This is especially true in products which are acidic or which produce acidic bodies on storage.

In order to more clearly describe the nature of the present invention, a specific example will hereinafter be described. It should be understood, however, that this is done solely by way of example and is intended neither to delineate the scope of the invention nor limit the ambit of the appended claims. In the Example and throughout the specification, percentages refer to percent by weight unless otherwise specified and are based on the dry substance weight of the fructose-containing syrup.

EXAMPLE I

This Example illustrates the refining of an enzymatically produced fructose-containing solution to produce a novel fructose-containing solution.

An enzymatically produced fructose-containing solution was made having the following characteristics:

| Ingredients: | Amounts (percent [1]) |
|---|---|
| Glucose | 51.8 |
| Fructose | 42.7 |
| Polysaccharides | 5.5 |
| Psicose [2] | 0.0 |
| Ash | 0.17 |
| Color units | 0.044 |

[1] Based on the dry substance present in the solution.
[2] Based on the method referred to in Table I, footnote (3).

This fructose-containing solution was adjusted to a pH of 4.5, passed through a bed of activated granular carbon (Pittsburgh SGL) and then through a column containing a strong acid cation exchange resin (Duolite C.3). The pH of the solution after this treatment was about 1.3. Then the solution was passed through a column containing a weak base anion exchange resin in the free base form (Duolite A-6) and adjusted to a pH of 4 to 4.5. This refined fructose-containing solution had the following characteristics:

| Ingredients: | Amounts (percent [1]) |
|---|---|
| Glucose | 53.4 |
| Fructose | 41.1 |
| Polysaccharides | 5.5 |
| Psicose [2] | 0.0 |
| Ash | 0.02 |
| Color units | 0.001 |
| Color stability [3] | 0.013 |

[1] Based on the dry substance present in the solution.
[2] Based on the method referred to in Table I, footnte (3).
[3] Color stability is measured by adjusting the solution to a pH of 4.8, maintaining the solution in a boiling water bath for one hour and measuring the color developed by the Method F-14 of the Second Edition of the Standard Analytical Methods of the Member Companies of the Corn Industries Research Foundation, Inc.

From the above it is readily seen that refining an enzymatically produced fructose-containing solution by the method of the present invention results in a solution which has essentially no color and is exceedingly stable as to color formation on storage. Furthermore, it should be noted that no psicose was generated during the refining of the solution.

The terms and expressions which have been employed are used as terms of description and not of limitation, and it is not intended in the use of such terms and expressions to exclude any equivalents of the features shown and described or portions thereof, since it is recognized that various modifications are possible within the scope of the invention claimed.

What is claimed is:

1. A method of refining an enzymatically produced fructose-containing solution wherein said solution is produced by enzymatically converting glucose to fructose and contains from about 30 to about 60 percent glucose, from about 10 to about 54 percent fructose, up to about 50 percent polysaccharides, up to about 1 percent psicose, color, color forming bodies and salts which contribute to the ash content of the syrup, comprising treating the solution with activated carbon thereby removing the major portion of the color and color forming bodies therefrom, maintaining the solution at an acidic pH, treating the solution with a strong acid cation exchange resin in the hydrogen form and a weak base anion exchange resin in the free base form to remove substantially all the remaining color, color forming bodies and the major portion of the metallic constituents of the salts which contribute to the ash content of the solution, said treatments being carried out to provide a fructose-containing solution which is substantially colorless and has little tendency to form color on storage and substantially no psicose is formed during the treatments.

2. A method of refining an enzymatically produced fructose-containing solution as defined in Claim 1, wherein the pH of the solution prior to being treated with activated carbon is in the range of from about 3 to about 5.

3. A method of refining an enzymatically produced fructose-containing solution as defined in Claim 2 wherein the solution being refined has a color of up to about 2 color units.

4. A method of refining an enzymatically produced fructose-containing solution as defined in Claim 2 wherein the solution being refined contains up to about 0.5 percent psicose.

References Cited

UNITED STATES PATENTS

| | | | |
|---|---|---|---|
| 3,050,444 | 8/1962 | Holstein | 195—31 F |
| 2,753,279 | 7/1956 | Cushing | 127—46 A |
| 2,845,369 | 7/1958 | Davis | 127—46 A |
| 3,305,395 | 2/1967 | Scallet | 99—142 X |
| 3,306,752 | 2/1967 | Ueda | 99—142 |
| 3,616,221 | 10/1971 | Takasaki | 195—31 F |

MORRIS O. WOLK, Primary Examiner

S. MARANTZ, Assistant Examiner

U.S. Cl. X.R.

127—29, 55; 195— 31 F

UNITED STATES PATENT OFFICE
CERTIFICATE OF CORRECTION

Patent No. 3,834,940     Dated September 10, 1974

Inventor(s) Khaja Khaleeluddin, Robert F. Sutthof and William J. Nelson

It is certified that error appears in the above-identified patent and that said Letters Patent are hereby corrected as shown below:

Column 1, line 3 (in the title); "Soultion" should read --Solution--.

Column 1, line 71 to column 2, line 1; delete phrase reading "In U. S. Patent Applications Ser. No. 88,190 and Ser. No. 88,187, now abandoned, both filed Nov. 8, 1970," and substitute therefor --In U. S. Patents 3,788,945 and 3,694,314--.

Column 2, line 15; delete "patent applications" and substitute therefor --patents--.

Column 2, line 71; "conductive" should read --conducive--.

Column 3, lines 4 to 5; delete "U. S. Patent Applications 88,190 and 88,187, both filed Nov. 9, 1970" and substitute therefor --U. S. Patents 3,788,945 and 3,694,314--.

Column 3, line 11; "patent applications" should read --patents--.

Columns 3-4, Table I; under "Color Units", delete periods following "2.0", "0.05" and "0.03". In the footnotes to Table I, footnote (3), last line; "(8:2:1 v./v.)" should read -- (8:2:1 V/V)--.

Columns 3-4, Table II; under "Color Stability", delete periods following "0.1", "0.02" and "0.01". In the footnotes to Table II, footnote (3), first line, "Saccahrides" should read --Saccharides--. Footnote (3), last line "(8:2:1 V./V.)" delete periods.

UNITED STATES PATENT OFFICE
CERTIFICATE OF CORRECTION p. 2

Patent No. 3,834,940        Dated September 10, 1974

Inventor(s) Khaja Khaleeluddin, Robert F. Sutthof and William J. Nelson

It is certified that error appears in the above-identified patent and that said Letters Patent are hereby corrected as shown below:

Column 5, line 51; "(Duolite C.3)" should read --(Duolite C-3)--.

Column 5, line 47; "footnte" should read --footnote--.

Column 5, line 67; "footnte" should read --footnote--.

Column 6; add the following claims:

5. A method of refining an enzymatically produced fructose-containing solution as defined in Claim 1 wherein the treatments are carried out to provide a fructose-containing solution containing up to about 1 percent psicose, a color of up to about 0.02 color units, a color stability of up to about 0.1 and an ash content up to about 0.05 percent.

6. A method of refining an enzymatically produced fructose-containing solution as defined in Claim 5, wherein the treatments are carried out to provide a fructose-containing solution containing up to about 0.5 percent psicose, a color of up to about 0.01 color units, a color stability of up to about 0.02 and an ash content up to about 0.03 percent.

7. A method of refining an enzymatically produced fructose-containing solution as defined in Claim 6, wherein the treatments are carried out to provide a fructose-containing solution containing up to about 0.1 percent psicose, a color of up to about 0.005 color units, a color stability of up to about 0.01 and an ash content of up to about 0.01 percent.

UNITED STATES PATENT OFFICE
CERTIFICATE OF CORRECTION p. 3

Patent No. 3,834,940   Dated September 10, 1974

Inventor(s) Khaja Khaleeluddin, Robert F. Sutthoff and William J. Nelson

It is certified that error appears in the above-identified patent and that said Letters Patent are hereby corrected as shown below:

The following art not cited by the Examiner was called to the attention of the Patent Office:

British Patent 1,103,394 to Agency of Industrial Science and Technology.

Takasaki et al., Ferm. Adv., Academic Press, pp. 561-589 (1969).

Wardrip, E. K., Candy Industry Combining Confectioner's Journal, reprint copy (1970).

Signed and Sealed this fourth Day of November 1975

[SEAL]

Attest:

RUTH C. MASON
Attesting Officer

C. MARSHALL DANN
Commissioner of Patents and Trademarks